United States Patent [19]

Pimpinella

[11] Patent Number: 5,080,461
[45] Date of Patent: Jan. 14, 1992

[54] RETRACTING OPTICAL FIBER CONNECTOR

[75] Inventor: Richard J. Pimpinella, Hampton, N.J.

[73] Assignee: AT&T Bell Laboratories, Murray Hill, N.J.

[21] Appl. No.: 608,102

[22] Filed: Oct. 31, 1990

[51] Int. Cl.⁵ .............................................. G02B 6/36
[52] U.S. Cl. ........................................ 385/65; 385/35
[58] Field of Search ................. 350/96.18, 96.2, 96.21

[56] References Cited

U.S. PATENT DOCUMENTS

| | | | |
|---|---|---|---|
| 4,323,300 | 4/1982 | Stewart et al. | 350/96.21 |
| 4,657,341 | 4/1987 | Sammueller | 350/96.22 |
| 4,889,406 | 12/1989 | Sezerman | 350/96.21 |
| 4,900,118 | 2/1990 | Yanagawa et al. | 350/96.21 |
| 4,962,990 | 10/1990 | Matsuzawa et al. | 350/96.18 X |
| 4,973,127 | 11/1990 | Cannon, Jr. et al. | 350/96.21 X |

Primary Examiner—Akm Ullah
Attorney, Agent, or Firm—Charles E. Graves

[57] ABSTRACT

Two sets of optical fiber ends to be connected are contained in opposing v-grooves in the respective interiors of a first (left) and a second (right) mating housings. In the unengaged position, the housing accesses are closed to protect the fibers. In the engaged position, the two housings form a protective enclosure. Each housing include mechanisms which are actuated by surface features of the other housing during mating engagement, to open the access doors to the housing interiors. Each fiber groove contains a fixed alignment ball whose center is on the fiber core axis. In the left housing, the v-groove in which the fiber and ball are contained, is formed on the underside of a pivotally mounted finger. When not engaged to the right housing, the finger is held in a retracted position. As the two housings engage, an actuator slidably mounted in the left housing is moved inwardly by contact with the right housing. This allows the fiber-containing finger in the left housing to commence pivoting downward on a detent of the actuator. Toward the end of the stroke, this ball and fiber assembly come to rest in an alignment groove formed in the floor of the right housing.

11 Claims, 3 Drawing Sheets

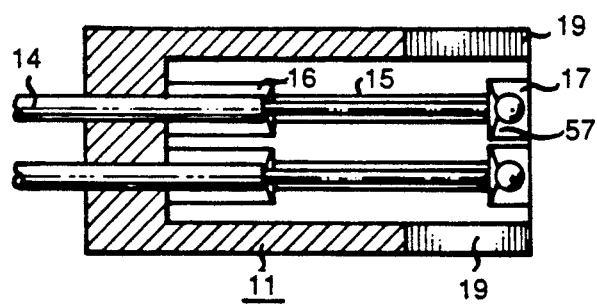
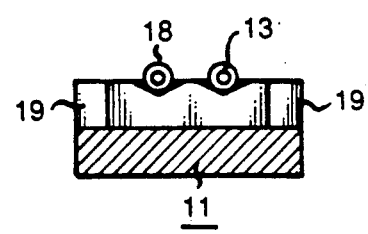
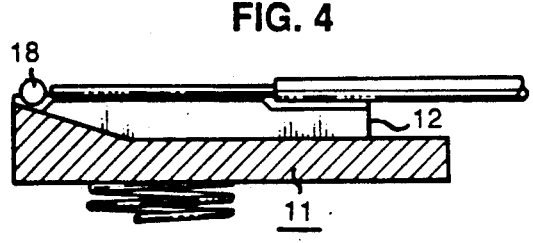
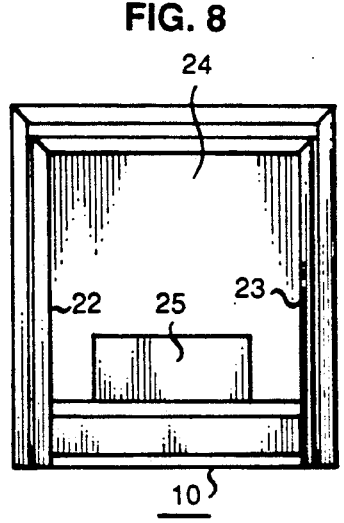
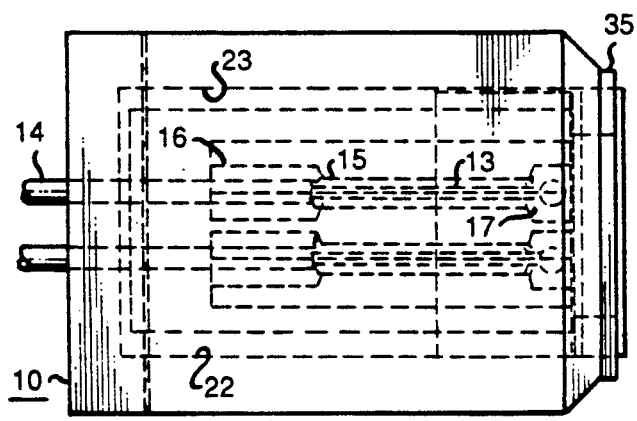
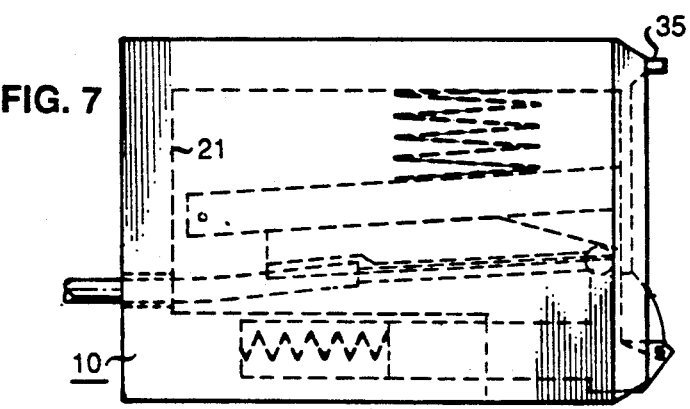
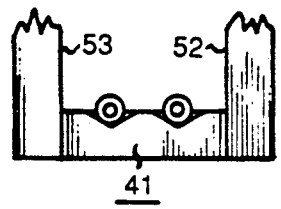

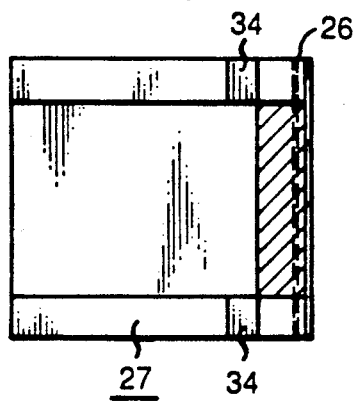
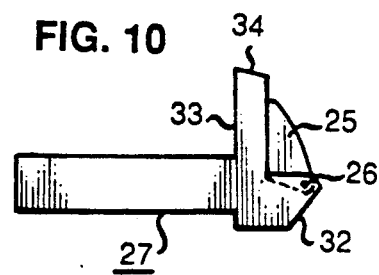
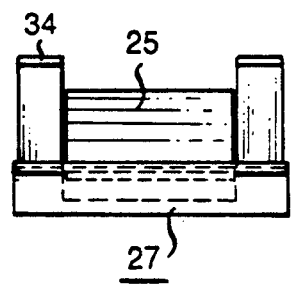
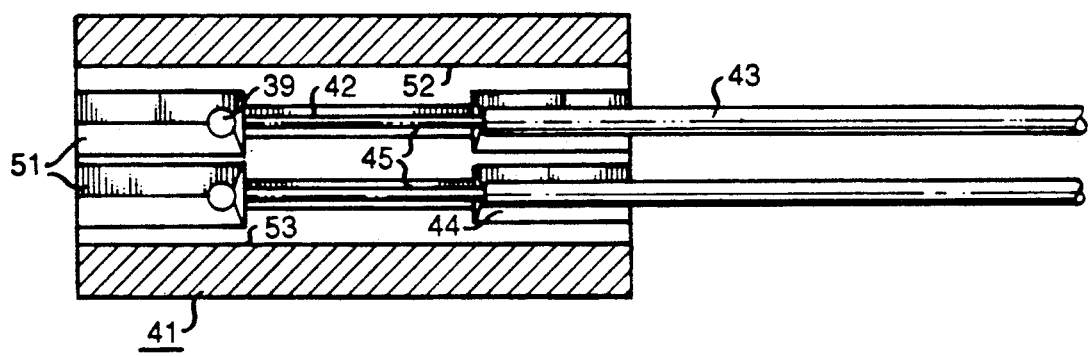
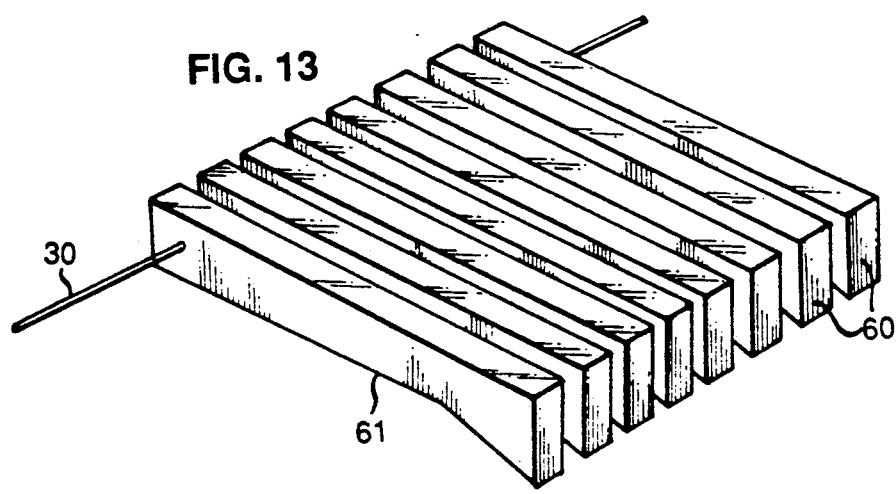

RETRACTING OPTICAL FIBER CONNECTOR

FIELD OF THE INVENTION

This invention relates to optical fiber connectors, and more particularly to an optical fiber connector for backplane use that physically protects the fibers during the coupling and decoupling while at the same time providing alignment of fibers.

BACKGROUND OF THE INVENTION

Most optical fiber connections are effected by embedding the fiber ends in a cylindrical sleeve, polishing the fiber ends, and inserting the prepared ends into an alignment ferrule, which optically and mechanically mates the fiber ends along a common axis. The connector ends may be attached to the ferrule by, for example, threaded or bayonet-type coupling nuts.

The connectors and connection methodology of the prior art exposes the fiber ends to damage or contamination. As a result, added effort must be expended to protect, clean and maintain the ends. Further, threaded or bayonet-type coupling nuts are not compatible with many optical backplane applications since access to connectors is often not possible. Frequently also, large spring retention forces are required to maintain the fiber ends in aligned contact in the presence of mechanical shock or vibrational energy.

The difficulty of adapting the conventional optical fiber connector technology to making gang or array connections is another drawback, especially in the connection of fibers in a backplane. For example, the popular v-groove fiber connector allows high density interconnection, but is susceptible to misalignments of the fiber ends. The current gang-type backplane optical fiber connectors are limited typically to two dozen or fewer interconnections, which is far fewer than needed for many applications. Further, as with the simpler fiber connectors, the current backplane optical fiber connectors do not sufficiently protect the fiber ends, tend to be expensive, and require high retention forces to meet shock and vibration conditions.

OBJECTS OF THE INVENTION

Accordingly, a broad object of the invention is to connect one or more pairs of optical fibers quickly and reliably, and in precise and stable end alignment.

Another object of the invention is to increase the reliability and ease of use of gang-type optical fiber connectors.

Another object of the invention is to reduce the cost of backplane optical fiber connections.

A further object of the invention is to avoid the exposure of optical fiber ends to atmospheric contamination or to unintended physical contacts during a mating or unmating operation.

A further object of the invention is to eliminate the use of alignment ferrules in making optical fiber connections thereby reducing connector size constraints.

SUMMARY OF THE INVENTION

In accordance with the invention, two sets of optical fiber ends to be connected are contained in opposing v-grooves in the respective interiors of a first (left) and a second (right) mating housings. The interiors are accessed by doors that open only when the housings are mated. In the unengaged position, the housing accesses are closed to protect the fibers. In the engaged position, the two housings combine to form a protective enclosure for the mated fibers. Each housing includes mechanisms which are actuated by surface features of the other housing during mating engagement, to open the access doors to the housing interiors.

The v-grooves are "opposing" in that corresponding v-grooves of each v-grooved subassembly are spaced with the same groove-to-groove separation to make the groove patterns of the two subassemblies congruent. Each fiber v-grooved subassembly contains an alignment feature and alignment ball or pin. In the design depicted here, the primary fiber groove contains a fixed alignment ball whose center is on the fiber core axis. The ball serves as both alignment mechanism and optical lens. In the left housing, the v-groove in which the fiber and ball are contained, is formed on the underside of a pivotally mounted fiber subassembly or finger. When not engaged to the second (right) mating housing, the finger is held in a retracted position. As the two housings engage, an actuator slidably mounted in the left housing is moved inwardly by contact with the right housing. This allows the fiber-containing finger in the left housing to commence pivoting downward on a detent of the actuator. Toward the end of the stroke, this ball and fiber subassembly comes to rest in an alignment groove formed in the floor of the right housing. Since the ball and fiber of the right housing is already situated in the alignment groove system, the fiber ends are set in axial alignment.

In this position, the two alignment balls not only provide accurate axial alignment of the two fibers, but also efficient focusing of the light emanating from the fiber ends through the optically transparent balls. Specifically, to reduce components, assembly, time, and cost, the lensing action of the alignment balls serves the function of centering the cores of the connecting fibers. In order to capture a maximum amount of light emitted from the fiber end, each ball must be situated very precisely with respect to the fiber end. It is advantageous therefore to fix the aligning balls with a transparent and index matching epoxy. Further, each ball is coated with an anti-reflective (AR) coating to further reduce reflections and loss.

Importantly, the basic inventive concept may be applied to connecting a multiplicity of optical fibers in a backplane. In this embodiment, it is advantageous to mount the individual fibers on independent pivot fingers to enable precision mating of the balls into their respective alignment grooves.

The invention and its further objects, features, and advantages will be fully understood from a reading of the detailed description to follow.

DESCRIPTION OF THE DRAWING

FIGS. 3, 4 and 5 are a bottom view, side view and front view respectively of the fiber-containing subassembly of the left housing;

FIGS. 6, 7 and 8 are top, side and front views respectively of the left housing.

FIGS. 9, 10 and 11 are top, side and front views respectively of the actuator element and door of the left housing;

FIG. 12 is a top view of the groove-containing floor of the right housing;

FIG. 13 is a schematic perspective sketch of a gang-type variation of the single fiber-containing subassembly of the left housing; and FIG. 14 is a front view of the right housing.

DETAILED DESCRIPTION OF AN ILLUSTRATIVE EMBODIMENT

Figure 1:
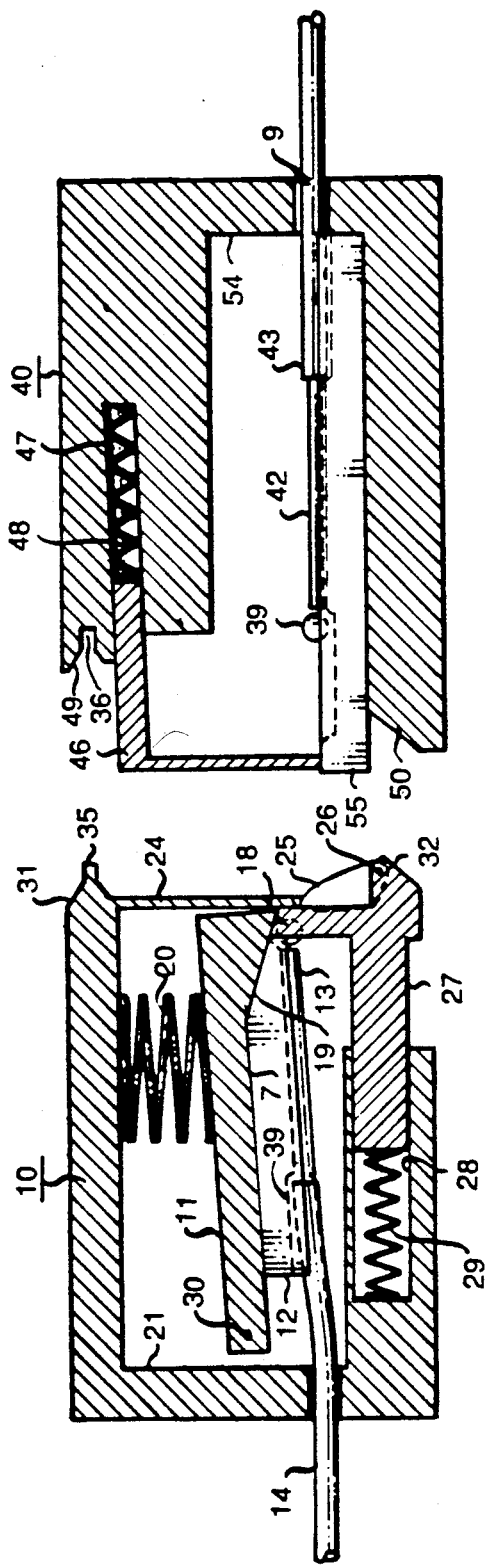
FIG. 1 is a sectional side view of the two housings in their unmated position.

FIG. 1 shows two mating housings 10, 40, which are the "left" and "right" housings. Left housing 10 comprises a platform 11 pivotally mounted by pin 30 fixed in the sides 22, 23 of housing 10. The exterior surfaces of housing 10, as well as certain of the internal detail, are shown in FIGS. 6, 7 and 8.

Referring now to FIGS. 1, 3, 4 and 5, a fiber subassembly 12 mounts on the underside of platform 11. An optical fiber 14 extends through an entrance 8 of rear wall 21 of housing 10 also providing strain relief. Fiber subassembly 12 includes one or more v-grooves 15 for receiving the unjacketed end of optical fiber 14. Two sets of grooves are shown formed in subassembly 12 in the illustrative example, for connecting two pairs of optical fibers; but it is understood that the inventive principles apply equally to connecting any number of fibers in a first set to mating fibers in a second set. The grooves 15, 16, 17 are seen in phantom in FIG. 6.

An extension 16 of each v-groove 15 receives a small length of the jacketed portion of fiber 14 to strain relieve the unjacketed portion. An alignment ball 18 is affixed in a relatively deeper and wider v-groove 17 disposed at the end of the fiber groove 15. The diameter of ball 18 in relation to the depth of v-groove 17 places the center of ball 18 on the optic axis of the optical fiber positioned in the groove-containing surface of the fiber subassembly 12.

Right housing 40 includes sidewalls 52, 53, and a floor 41 in which is formed fiber v-grooves 45 as seen in FIG. 12. Fiber 42 enters housing 40 through a fiber entrance 9 in the rear wall 54. An enlarged v-groove 44 receives the jacketed end of fiber 42. A recessed v-groove 51 which serves the same purpose as v-groove 17, contains a fixedly mounted alignment ball lens 39. The diameter of ball 39 in reaction to the depth of v-groove 51 is such that the center of ball 39 is on the optic axis defined by the core of the fiber 42 and the depth of the fiber groove 45.

The alignment balls 18 and 39 are affixed in position in their respective v-grooves by epoxy compound. The index-matching epoxy also provides for a low loss transmission channel between the fiber end and the ball's surface.

Right housing 40 includes a retracting entrance door 46 which mounts in a door slide 47. When the housings 10, 40 are not mated, door 46 is biased into a forward direction by action of spring 48. In this position, door 46 closes the entrance to the interior of housing 40.

Similarly, left housing 10 has an access door 25, which permits access to the interior of housing 10. Door 25 is mounted on the foot 32 of actuator 27 by pivot pin 26, as seen in FIG. 10 for example. When housing 10 is not mated to housing 40, the entrance to the interior of housing 10 is sealed by door 25.

The actuator 27, shown in further detail in FIGS. 9, 10 and 11, slidably mounts in a cavity 28 formed in the bottom of housing 10. Actuator 27 is normally biased in a forward position against the interior side of front wall 24 of housing 10. Contact of the door 25 and foot 32 with the end surface 55 and 50 respectively of right housing 40 during the mating of the two housings 10, 40, causes movement inwardly of the actuator 27. This results in relative movement of ramp 19 and the post surfaces 34 on which the ramp 19 rests. By this action, the platform 11 and its optical fiber(s) is raised or lowered as actuator 27 moves in and out of the cavity 28.

In the position shown in FIG. 1, the platform 11 is supported in a raised or retracted position, in which the fiber end is disposed upwardly in the interior of housing 10. As actuator 27 enters the cavity 28, the ramp 19 of platform 11 moves downward under the bias of loading spring 20 pressing on the topside of platform 11. The fiber 13 thereby is lowered toward the plane of the top surface of the lower interior floor of housing 10. Toward the end of the travel of actuator 27, alignment ball 18 of the left housing engages alignment groove 51 of right housing 40; and, in accordance with the invention, optically aligns with the alignment ball 39. In this position, the two alignment balls are both situated in optical alignment in the grooves 51, as depicted in FIG. 2.

Figure 2:
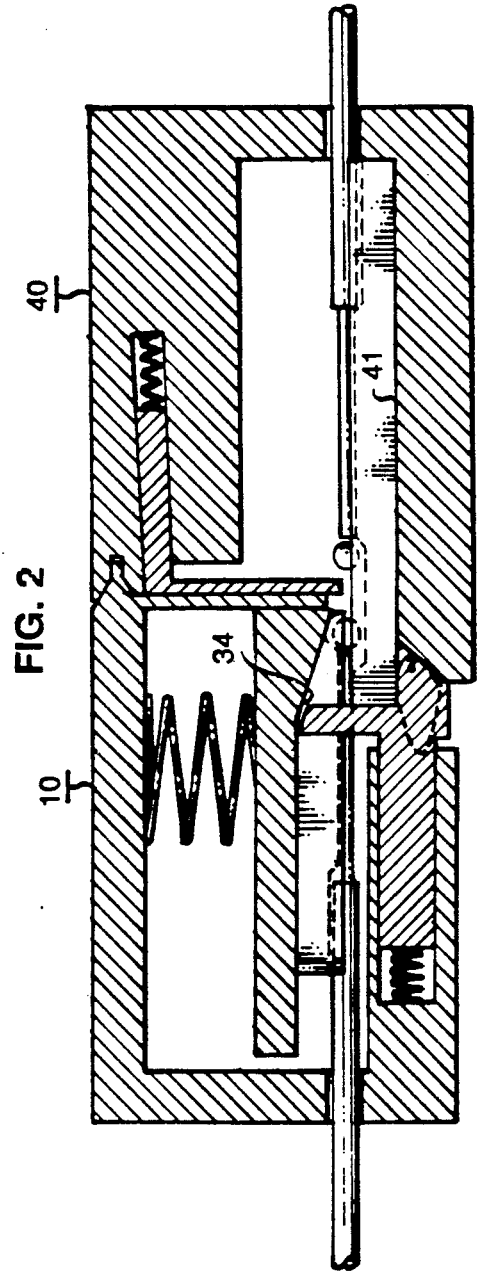
FIG. 2 is a sectional side view of the two housings in their mated position.

To assure that ball 18 fully engages in the groove 51, it is advantageous to allow a slight additional amount of travel of the actuator 27 and thereby enable the surface 34 of posts 33 to disengage and create a clearance between the surfaces, denoted 57 in FIG. 2.

It will be appreciated by those skilled in the art of optical fiber connections that the fiber platform 11 should be mounted on its pivot pin 30 within the interior of housing 10 with a certain amount of freedom of movement in the direction of the pivot pin axis. The freedom will allow the platform 11 to adjust if, during mating, the ball 18 does not happen to align with its center precisely in the plane that bisects the v-groove 51. In such case, the lateral freedom will allow the ball 18 to seek out the v-groove sides and thereby assume its desired alignment.

As seen in FIG. 2, to effect a fully protective end seal as the housings 10, 40 mate, the front ends of the side walls 22, 23 of housing 10 close onto the front ends of the side walls 52, 53 of housing 40, with beveled surface 31 abutting stop 49 on housing 40. The beveled foot 32 of housing 10 closes onto lower stop 50 of housing 40.

It is also useful to assure that the housings 10, 40 resist relative motion in a plane normal to the fiber axes. Such motion could, for example, be caused by vibration. Accordingly, pursuant to another aspect of the invention, an alignment finger 35 seen in FIG. 7 is formed on the upper guide surface 31 of housing 10. Finger 35 closely engages into the mating alignment slot 36 of housing 40, thus preventing the grooves containing the mating fibers from vibrating out of alignment.

The invention offers a further advantage, in that it is not critical to maintain a very precise separation between the alignment balls 18, 39 when the balls are both disposed in groove 51. This is due to the fact that the radii of the balls 18, 39 and the distance of the balls from the light-emitting ends of the respective fibers 14, 42 are carefully set and thereafter fixed with epoxy, to assure that light entering a ball from the adjacent fiber travels in parallel rays.

The epoxy should have an index of refraction that matches the refractive indices of the glass fiber core and the alignment ball. Matching the refractive indexes allows the epoxy to be extended advantageously around the balls and the fiber ends, an expedient that reduces the incidence of loss at the point of connection. For 1300 mm light, for example, a 2200Å±280Å AR coating of silicon dioxide ($SiO_2$) increasing transmission to better than 99.9%.

The balls, 18, 39 may be formed of sapphire and in this embodiment are 300 microns in diameter. The fiber-to-lens surface separation is about 85 microns.

The invention has been described so far in an embodiment in which one or two optical fibers are contained in each of the housings 10, 40. In a primary application of the basic invention, a multiplicity of optical fibers can be accommodated in each housing to effect a gang connection. In this application, particularly if fibers of more than one diameter are present in the gang connection, it is advantageous to mount the individual fibers on separate pivot arms or subassemblies in the left housing. Independent mounting allows variation in alignment ball diameter associated with each fiber contained in the left housing to seek out its own position in the alignment grooves 51 of the right housing.

To illustrate, FIG. 13 shows an array of arms, each denoted 60, and each serving the fiber-mounting purpose of the platform 11. Each arm 60 includes a fiber subassembly 61 that is formed with a fiber groove and a v-groove recess for an alignment ball (not shown), as has been described above with respect to platform 11 and holder 12. Like the platform 11, each arm 60 is biased downward by a spring (not shown) such as spring 20. Each arm 60 functions substantially the same as the structure illustrated in FIGS. 1 and 2, to allow individual fibers and their associated alignment balls to be guided into alignment slots contained in a mating housing. Alternatively, magnetic, electromagnetic, or shape memory alloy actuators can be used in place of the mechanical actuator means shown here.

It should be apparent to persons skilled in the art that the inventive embodiment depicted in FIG. 13 can easily accommodate in one gang-connector structure different sizes (diameters) of optical fibers as well as variations in ball diameter. The shape and depth of the fiber-containing v-grooves, and that of the ball-containing v-grooves can be varied and set to achieve the foregoing.

I claim:

1. Apparatus for connecting two sets of optical fibers, comprising:
    first and second members, each comprising one or more v-grooves for fixedly containing a corresponding number of fiber ends of the respective fiber sets;
    the v-grooves of said first member being spaced apart congruently with respect to the v-grooves of said second member;
    a focusing-alignment element fixedly mounted in each said v-groove adjacent each said fiber end;
    each said element being shaped to self-center in its respective v-groove in a position that aligns its optical axis with that of the fiber contained therein;
    each said element of said first member being further shaped to self-center in the corresponding v-groove of said second member to place the respective corresponding fiber axis in alignment; and
    means for retaining said first and second members in fixed relation when said focusing-alignment elements are in their alignment position.

2. Apparatus in accordance with claim 1, wherein said focusing-alignment elements are spherical.

3. Apparatus in accordance with claim 2, further comprising:
    means for positioning said first member with respect to said second member to place the individual optical fibers contained in said first member in a retracted position or alternatively in said alignment position.

4. An optical fiber connector for connecting two sets of optical fibers, comprising:
    left and right mating housings;
    said left housing comprising a fiber-mounting member pivotally mounted in the housing interior;
    said member comprising one or more v-grooves for fixedly containing a corresponding number of fiber ends of the first fiber set;
    a first focusing-alignment element fixedly disposed in the v-groove adjacent each said fiber end of the first fiber set;
    each said first element being shaped to self-center in its respective v-groove in a position that aligns its optical axis with that of the fiber contained therein;
    said right housing comprising a floor containing one or more v-grooves for fixedly containing a corresponding number of fiber ends of the second fiber set;
    the v-grooves of said first member being spaced apart congruently with respect to the v-grooves of said floor;
    a second focusing-alignment element fixedly disposed in the v-groove of said right housing floor adjacent each said fiber end;
    each said first focusing-alignment element being further shaped to self-center in a corresponding v-groove of said floor of said right housing to place the respective corresponding fiber axis in alignment; and
    means for retaining said fiber-mounting member of said first housing and said floor of said second housing in fixed relation when said elements are in their alignment position.

5. The optical connector of claim 4, wherein said left housing further comprises:
    a front access door to the interior of said housing;
    plunger means pivotally mounting said door in a normally closed position;
    said plunger means supporting said fiber-containing member member in its retracted position when said door is closed;
    means responsive to the engagement of said first and second housings for opening said door and moving said plunger rearwardly in said left housing; and
    means responsive to said plunger rearward movement for lowering said member, thereby bringing said first element into engagement with the v-groove of said right housing floor to effect an optical transmission path between said respective fiber ends.

6. The optical connector of claim 5, wherein said left housing further comprises:
    a front wall; and
    means for biasing said plunger means in a forward position against the interior side of said front wall, thereby to maintain said door in its closed position.

7. The optical connector of claim 6, wherein said right housing further comprises:
    an entrance door;
    means for slidably mounting said entrance door in said right housing; and means for biasing said entrance door in a forward direction, thereby to maintain said door closed door when said housings are unengaged.

8. The optical connector of claim 7, further comprising:

means for mounting said member of said left housing to have freedom of movement in the direction of the pivot pin axis.

9. The optical connector of claim 8, wherein said left housing further comprises:

an upper guide surface and an alignment finger formed on said upper guide surface; and said right housing further comprises:

an alignment slot formed in the front, said finger closely engaging said slot, thereby to prevent said v-grooves containing the mating fibers from vibrating out of alignment.

10. The optical connector of claim 9, wherein the distance of said focusing-alignment elements from the light-emitting ends of the respective fibers, is set and thereafter fixed in an epoxy having an index of refraction matching the refractive indices of said fibers and said elements.

11. The optical fiber of claim 10, wherein each said focusing-alignment element is coated with an antireflective material.

* * * * *